United States Patent
Wu et al.

(10) Patent No.: US 9,619,686 B2
(45) Date of Patent: Apr. 11, 2017

(54) PRINTED TAG INFORMATION RECOGNITION USING MULTI-POSE ILLUMINATION TO MITIGATE GLARE

(71) Applicant: Xerox Corporation, Norwalk, CT (US)

(72) Inventors: Wencheng Wu, Webster, NY (US); Robert P. Loce, Webster, NY (US); Raja Bala, Pittsford, NY (US); Peter Paul, Pittsford, NY (US); Thomas F. Wade, Rochester, NY (US); Dennis L. Venable, Marion, NY (US); Steven R. Moore, Pittsford, NY (US); Peter J. Knausdorf, Henrietta, NY (US)

(73) Assignee: Conduent Business Services, LLC, Dallas, TX (US)

( * ) Notice: Subject to any disclaimer, the term of this patent is extended or adjusted under 35 U.S.C. 154(b) by 109 days.

(21) Appl. No.: 14/643,721

(22) Filed: Mar. 10, 2015

(65) Prior Publication Data

US 2016/0267304 A1  Sep. 15, 2016

(51) Int. Cl.
*G06K 7/10* (2006.01)
*G06K 7/14* (2006.01)
*G06T 5/00* (2006.01)

(52) U.S. Cl.
CPC ..... *G06K 7/10732* (2013.01); *G06K 7/10574* (2013.01); *G06K 7/10722* (2013.01); *G06K 7/10821* (2013.01); *G06K 7/146* (2013.01); *G06K 7/1443* (2013.01); *G06K 7/1465* (2013.01); *G06T 5/001* (2013.01); *G06T 2207/10152* (2013.01)

(58) Field of Classification Search
CPC ....................... G06K 7/10574; G06K 7/10732

USPC ................................................. 235/411, 454
See application file for complete search history.

(56) References Cited

U.S. PATENT DOCUMENTS 7,204,420 B2 * 4/2007 Barkan .............. G06K 7/10722
                                                                  235/462.01
8,199,370 B2   6/2012 Irwin, Jr. et al.
(Continued)

OTHER PUBLICATIONS

"Advanced Bar Code Readers" (http://www.codecorp.com/glare-reduction.php), printed Mar. 10, 2015, 1 page.

*Primary Examiner* — Toan Ly
(74) *Attorney, Agent, or Firm* — Kevin Soules; Kermit D. Lopez; Luis M. Ortiz

(57) ABSTRACT

Eliminate or reduce the impact of glare in printed information tag recognition applications using single- and multi-pose external illumination coupled with intelligent processing. A shelf imager can acquire shelf images for printed information tag localization and recognition. An external illuminator can provide at least one illumination condition/pose for shelf image acquisition in addition to lighting associated with the enclosed environment. A glare region of interest (ROI) detector can analyze all or a portion of the acquired shelf images for glare to determine whether additional images need to be acquired using different illumination conditions provided by the single- or multi-pose external illuminator or whether full or portion of acquired images need to be analyzed by a printed information tag locator and recognizer. A printed information tag locator and recognizer can analyze all or a portion of the acquired images to localize and recognize data printed on the printed information tags.

17 Claims, 8 Drawing Sheets

(56) References Cited

U.S. PATENT DOCUMENTS 8,638,479 B2  1/2014  Irwin, Jr. et al.
2012/0211555 A1* 8/2012 Rowe .................. G06K 7/1404
                                                        235/375

* cited by examiner

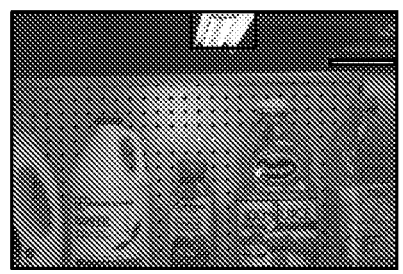
FIG. 6A
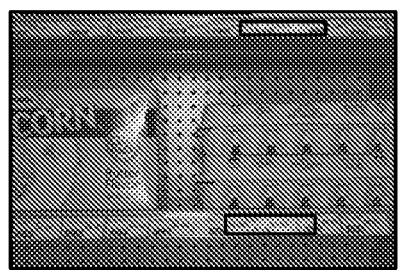
FIG. 6D
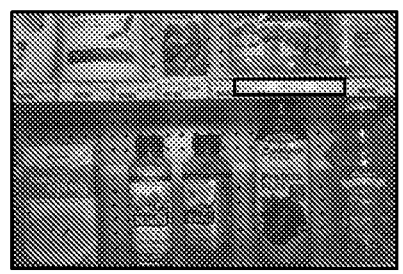
FIG. 6B
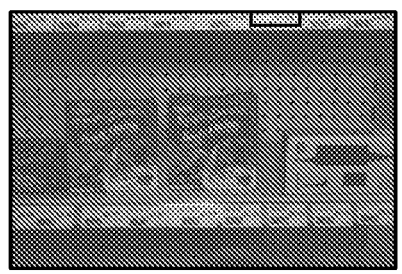
FIG. 6E
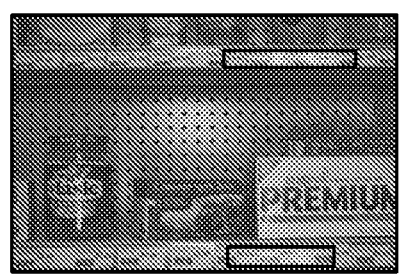
FIG. 6C
NO IMAGE ACQUIRED AT THIS LOCATION
FIG. 6F

PRINTED TAG INFORMATION RECOGNITION USING MULTI-POSE ILLUMINATION TO MITIGATE GLARE

FIELD OF THE INVENTION

The present invention is generally related to printed tag information detection and recognition. More particularly, the present invention is related to systems and methods that improve printed tag information (e.g., barcode) detection and recognition rates by capturing multiple images under different illumination poses when glare caused by environmental factors such as lighting is present.

BACKGROUND

Imaging glare can impede or reduce printed tag information recognition. For example, glare has interferred with barcode detection and recognition of barcodes used in retail applications wherein various image-based and video-based analytics are being developed. Automated systems for determining the spatial layout of products in a store via barcode recognition are currently being developed but depend on accurate barcode recognition. Barcode recognition is a problem mostly due to glare caused by lighting existing in the environment where barcodes are being used. This problem is further exacerbated when barcodes are covered by clear plastic coatings. The problem equally applies to the recognition of other patterns or numbers, e.g., such as QR codes and UPC codes that are used to identify product and inventory and also applies in non-retail applications wherein accurate printed tag information detection and recognition is necessary.

Glare refers to saturated regions in images typically caused by specular reflection from the surface of an object being imaged and can impede recognition of printed information. For example, when a glare region overlaps a barcode region, image processing cannot resolve the bars in most cases because the barcode may be completely white or wiped out in the images due to gray-level saturation. An ideal solution is to have an imaging system that does not generate images with glare regions in the first place; but due to the lighting variability in and across stores and the constraints in imaging systems, it is not feasible in practice. To make the matter worse, most price-tags are inserted in a plastic strip at the facing of the shelf, where the plastic has a high degree of specular reflection and is positioned at an angle that reflects light from ceiling facility illumination into the direction of the imaging system. This combination of lighting and imaging geometry and high specular refection tends to increase the prevalence of glare when imaging tags are located on shelf facing.

What is needed are systems and methods that can overcome printed tag information recognition problems caused by glare. The present inventors describe systems and methods to enhance tag information recognition rates by reducing the effect of glare on printed tags during imaging.

SUMMARY OF THE INVENTION

It is, therefore, an aspect of the present invention to enhance printed tag information (e.g., barcode) recognition rates by reducing the effect of glare during imaging.

It is yet another feature of the present invention to provide an imaging and illumination system with glare mitigation to eliminate the negative impact of glare on the ability to recognize printed tag information in commercial and industrial applications.

It is yet another feature that the imaging and illumination system and methods can utilize a multi-pose external illuminator coupled with algorithmic control and processing to eliminate the degradation of printed tag information recognition.

In accordance with aspects of an embodiment of the present invention, an imaging and illumination system can be provided that include a store shelf imager, which can acquire shelf images for barcode localization and recognition, an external illuminator, which can provide at least one additional illumination condition (e.g., pose) for shelf image acquisition, a glare region of interest (ROI) detector, which can analyze full or partial areas of the acquired images for glare to determine whether additional images need to be acquired using different illumination condition(s) provided by the multi-pose external illuminator or whether full or portion of acquired images need to be analyzed by a barcode locator and recognizer, which can also analyze full or partial areas of acquired images to localize and recognize barcodes.

In accordance with aspects of another embodiment of the present invention, a method in the form of a computer-controlled processing sequence can be provided that acquires shelf images without an external illuminator (e.g., if store lighting is on) or with the first pose of the external illuminator (e.g., if store lighting is off), detects glare regions of interest (ROIs) in these images, acquires images with a different pose of external illuminator for any sub-imaging system with at least one glare ROI detected, checks if the glare remains on this new set of images for those detected glare ROIs, and, if not, replace the detected glare ROIs with corresponding regions in the new set of images to accomplish barcode recognition.

In accordance with another feature of the embodiments of the present invention, the external illuminator can be a controllable multi-pose external illuminator.

It is also a feature of the present invention to enable repeat checking if glare remains on any new set of images for those detected glare ROIs and, if so, to replace the detected glare ROIs with corresponding regions in the new set of acquired images to accomplish printed tag information recognition until no more detected glare ROIs remain, or all poses of a multi-pose illuminator have been explored.

BRIEF DESCRIPTION OF THE DRAWINGS

FIGS. 6a-6f illustrate photographs of a set of images from the mock retail shelf segment using an additional pose of external illumination of the tags shown in FIG. 5a-5f and detected glare ROIs therefrom;

DETAILED DESCRIPTION

Figure 1:
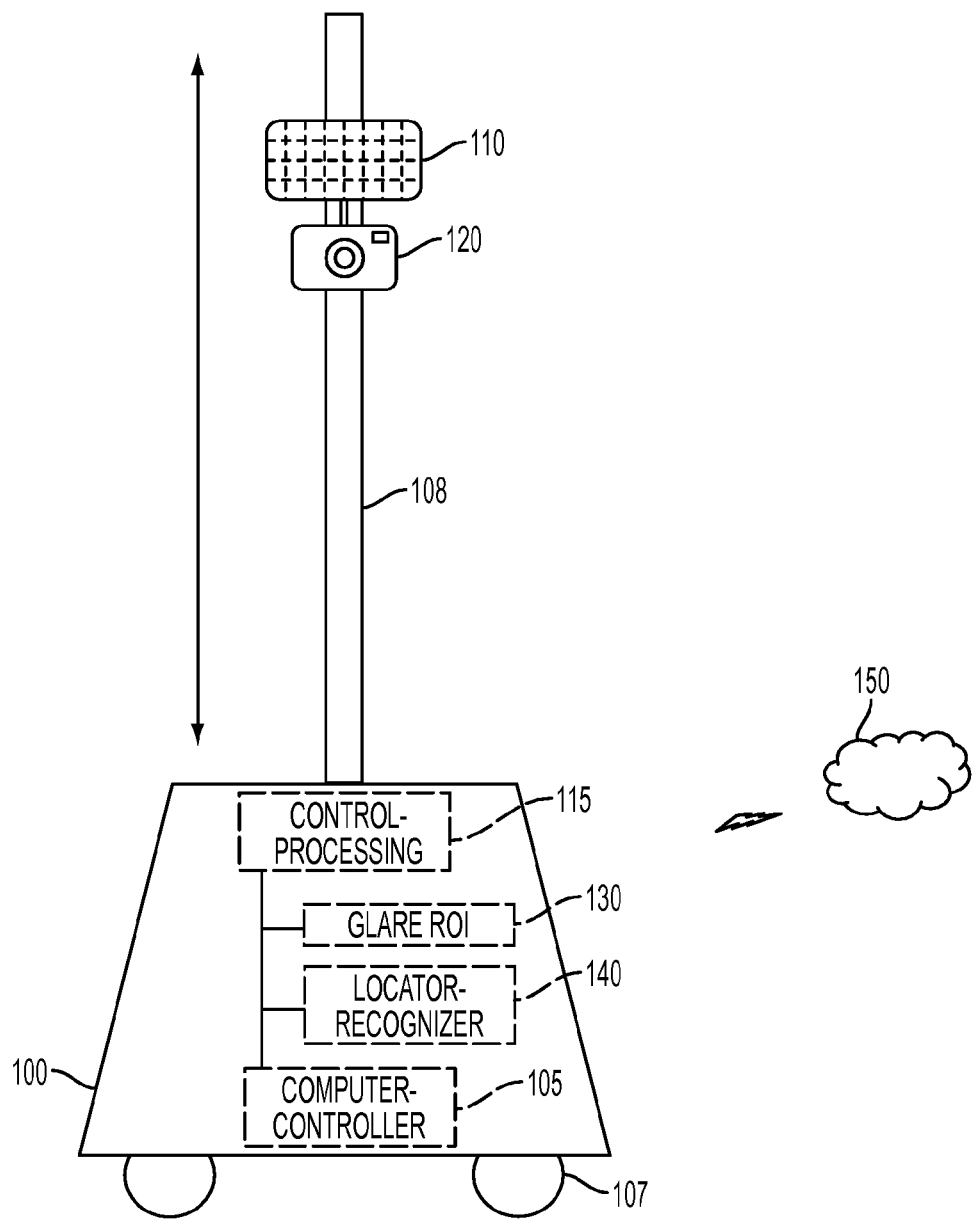
FIG. 1 illustrates a system in accordance with embodiments of the present invention.

Due to the prevalence of surveillance cameras and the increasing interest in data-driven decision-making for operational excellence, several technical initiatives are currently focused on developing methods of collecting/extracting image-based and/or video-based analytics. In particular, but without limiting the applicable scope of the present invention, there is a desire by industry to bring new image- and video-based technologies into retail business settings. An example is wherein image- and video-based technologies are being used that include store shelf-product imaging and identification, spatial product layout characterization, barcode and SKU recognition, auxiliary product information extraction, and panoramic imaging of retail environments.

Without unnecessarily limiting the scope of the present invention to retail uses, there are, for example, a large number of retail chains worldwide and across various market segments, including pharmacy, grocery, home improvement, and others. Functions that many such chains have in common are sale advertising and merchandising. An element within these processes is the printing and posting of sale item signage within each store, which very often occurs at a weekly cadence. It would be advantageous to each store if this signage was printed and packed in the order in which a person encounters sale products while walking down each aisle. Doing so eliminates a non-value-add step of manually having to pre-sort the signage into the specific order appropriate for a given store. Unfortunately, with few current exceptions, retail chains cannot control or predict the product locations across each of their stores. This may be due to a number of factors: store manager discretion, local product merchandising campaigns, different store layouts, etc. Thus it would be advantageous to a retail chain to be able to collect product location data (which can also be referred to as a store profile) automatically across its stores, since each store could then receive signage in an appropriate order to avoid a pre-sorting step.

There is growing interest by retail enterprises in having systems that use image acquisition for accelerating the process of determining the spatial layout of products in a store using printed tag information recognition. Although "barcodes" will be described as the tag information for purposes of the rest of this disclosure, it should be appreciated that imaging could equally apply to other patterns (e.g., such as QR codes) and serial numbers (e.g., such as UPC codes). Furthermore, the solutions disclosed herein can apply to several environments including retail, warehouse and manufacturing applications, where identifying barcoded item location is desired. The invention described herein addresses a critical failure mode of such a system. In particular, the present invention is generally aimed at eliminating or reducing the impact of imaging glare (e.g., reflection of the light fixtures, specular light, etc.) on the overall printed tag information recognition rate.

Referring to FIG. 1, an imaging and illumination system 100 with glare mitigation for eliminating the impact of glare in imaging to the degradation of barcode recognition is illustrated. The invention is taught in the context of a retail setting for exemplary purposes, but as stated hereinbefore this should not be taken as a limitation with respect to its scope or application. This imaging and illumination system 100 can be robotic, e.g., wheeled 107 for movement along flooring and have mechanized tracking 108 to move imaging equipment vertically with mechanical movements that can be computer-controlled 105. The imaging and illumination system can also be locally controlled or remote controlled via a data network 150. The heart of the imaging and illumination system 100 utilizes the addition of an external illuminator 110 coupled with algorithmic control and processing unit 15 to eliminate the degradation of barcode recognition. The imaging and illumination system 100 can include: (1) a store shelf imager 120 (e.g., camera), which can acquire shelf images for barcode localization and recognition; (2) the external illuminator 110, which can provide at least one additional illumination condition (e.g., varying poses) for shelf image acquisition; (3) a glare region of interest (ROI) detector 130, which can analyze the entirety, or a portion of each acquired image for glare to determine whether additional images for each analyzed image need to be acquired using different illumination conditions provided by the external illuminator 110, or acquired images without glare issues in the region of interest (or where additional imaging has cleared up glare issues) can be analyzed by barcode locator and recognizer 140; and (4) a barcode locator and recognizer 140, which can analyze acquired images to localize and recognize barcodes located in the region of interest thereon. Although the entire tag could be analyzed for glare, processing can be simplified and expedited when only the portion of a tag that carries the barcode information, which is the glare region of interest, is analyzed. In this case, the system is only concerned with glare in the bar-coded portion of a larger tag. If this is the case, the system analyzes only that bar-coded portion (glare region of interest) of a larger tag for glare issues when following the above-described process. It should be appreciated that the glare region of interest (ROI) detector 130 and the barcode locator and recognizer 140 can be provided as modules in the algorithmic control and processing unit 115. Robotic controller 105 can also be incorporated to function under a shared microprocessor as part of algorithmic control and processing unit 115.

Figure 2A:
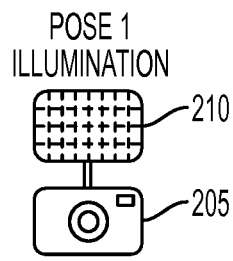
FIG. 2a-2c illustrates an external illuminator in accordance with embodiments of the present invention, and in particular (a) one-pose illuminator, (b) Discrete N-pose illuminator, and (c) Continuous/controllable multi-pose illuminator.
Figure 2B:
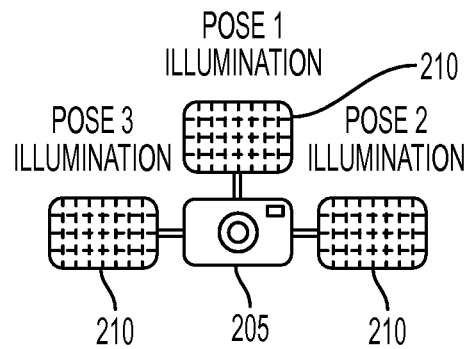
Figure 2C:
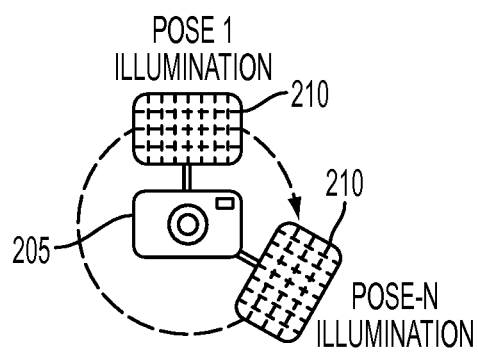

Referring to FIGS. 2a-c, additional aspects of an external illuminator in accordance with embodiments of the present invention are illustrated in the form of a multi-pose external illuminator 210 associated with a camera 205. FIG. 2a illustrates an external illuminator 210 set up for a fixed pose of illumination above a camera 205. FIG. 2b illustrates an external illuminator 210 similar to FIG. 2a, but having the ability to provide multiple discrete poses of illumination around the camera 205. As shown in FIG. 2b, external illuminator 210 can be placed into three discrete poses—pose 1, pose 2, and pose 3—by a system controller (see FIG. 1). Then, as shown in FIG. 2c, the external illuminator 210 can be placed in multiple positions, e.g., up to 360 degrees, around the camera 205. The sequence of illumination can be random, pre-specified, or based on the learned effectiveness from previous acquisition and image analyses. For continuous/controllable poses of illumination as shown in FIG. 2c, the positions and sequence can be carried out in the same manner, or done dynamically based on feedback through image analyses (e.g., from the results of image intensities of the previously detected glare ROIs). It should also be noted that the angle for each pose of illumination can be different, although this is not specifically or clearly shown in FIG. 2. Furthermore, it should be noted that the spectrum for each pose of illumination may be different and may be optimized based on the environment of the retail stores and customer requirements.

Figure 3:
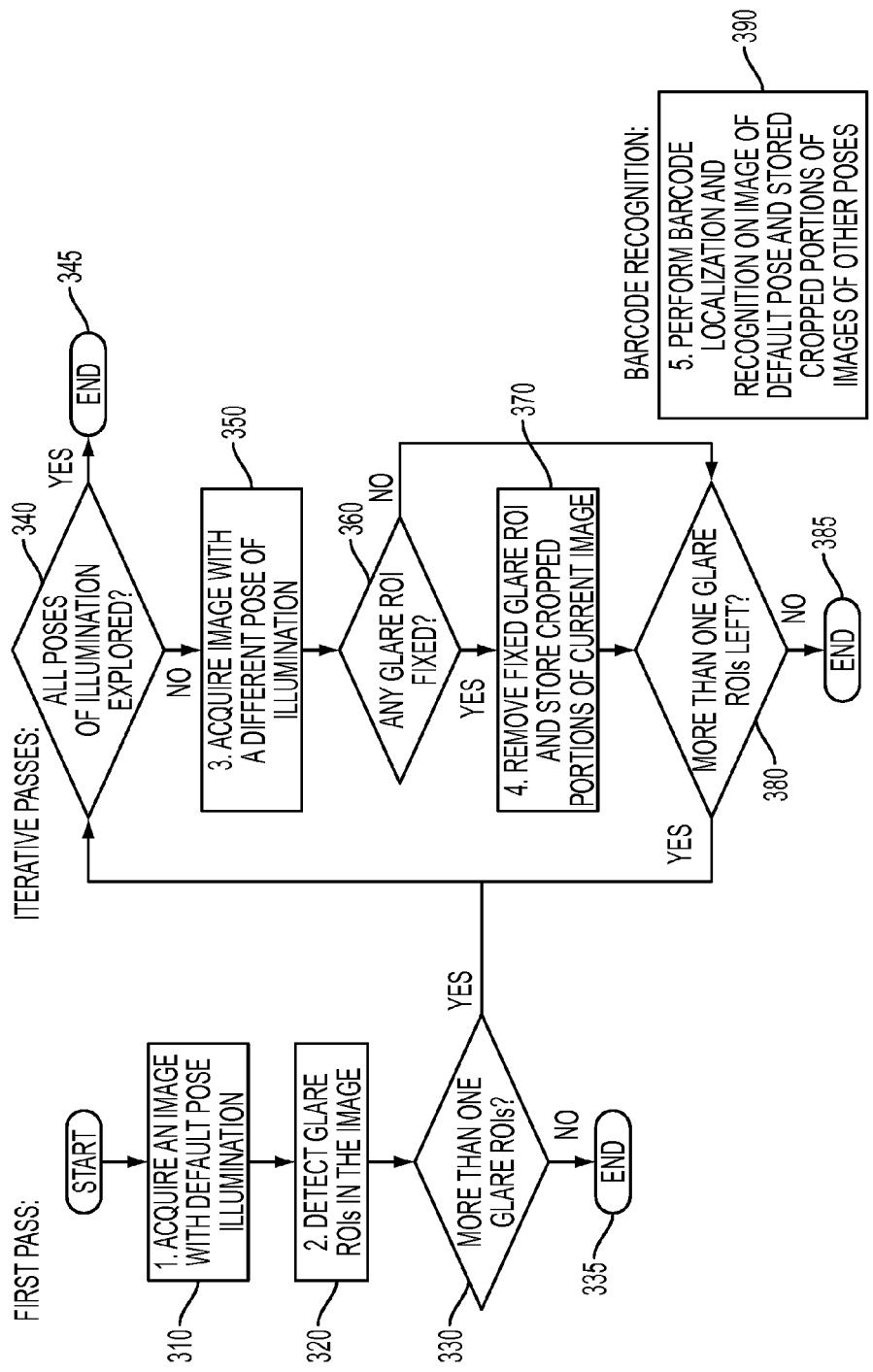
FIG. 3 illustrates an imaging and processing sequence for a glare mitigation system using multi-pose illumination in accordance with an embodiment of the present invention.

Referring to FIG. 3, a flow chart of a method in accordance with features of the present embodiments is shown. The method begins with a first pass where an image is acquired using the default pose illumination as shown in Block 310 and detects whether there is at least one glare ROI in this image, as shown in Block 320. If not as determined in Block 330, the image is sent to the barcode locator and recognizer for barcode recognition, as shown in Block 390; and the process stops, as shown in Block 335. If more than one glare ROI is detected, then iterative passes can be performed while utilizing additional multi-pose illumination to substitute/remove the glare ROIs detected from the first pass acquired images, as shown in Block 340. Then the process will end as shown in Block 345. If it is determined, however, that not all poses of the illumination have been explored, as shown in Block 340, then an image with a different pose of the illumination can be acquired, as shown in Block 350. After the subsequent image acquisition, only the sub-images (cropped portions) of the current image are examined at the remaining previously detected glare ROIs. For each remaining glare ROI, the cropped portion of the current image can be checked to determine if it is still considered as glare ROI (i.e., whether the image content is still substantially saturated), as shown in Block 360. If not, this means that the current pose of illumination fixed the corresponding glare ROI. The glare ROI can thus be removed from the list of previously detected glare ROIs and the cropped portion of current image can be stored for later barcode recognition processing, as shown in Block 370. If yes, this means that the current pose of illumination is not helpful. No cropped images are stored in this case. The iterative process continues as determined at Block 380 until either no more previously detected glare ROIs remain on the list (i.e., all glare ROIs have been fixed by some poses of the illumination) or all poses of the illumination have been used to acquire images. The iterative process ends as shown in Block 385. Finally, barcode recognition is performed on the full image acquired with default-pose illumination and all stored cropped portions of various images acquired with other-poses of illumination, as shown in Block 390.

Figure 4:
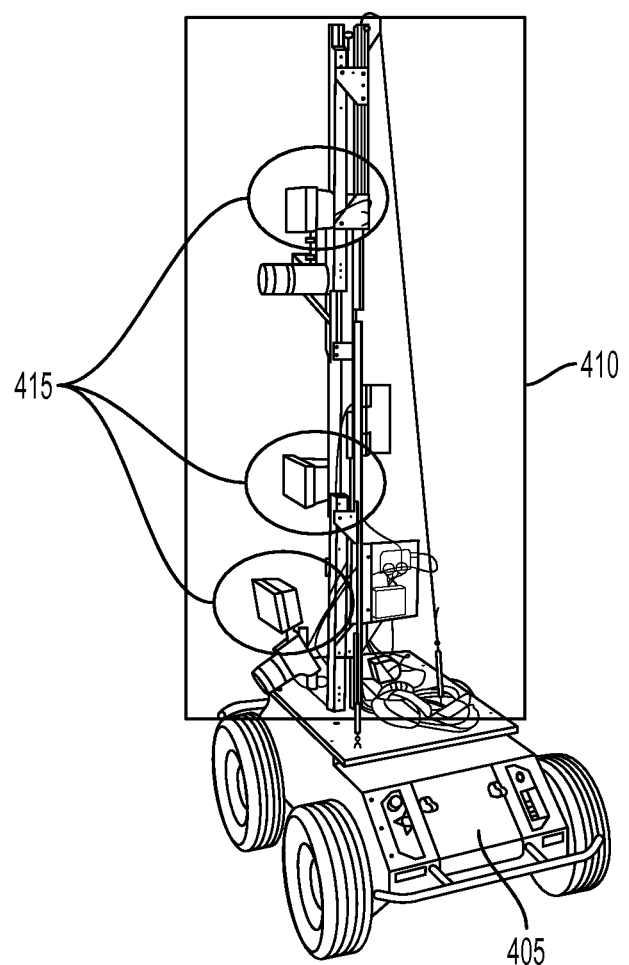
FIG. 4 illustrates a drawing of a prototype for a robotic imaging system with controllable external illuminator for achieving glare mitigation in accordance with embodiments of the present invention.

Referring to FIG. 4, a drawing of a prototype imaging system is shown. The prototype system is robotically controlled 405 and includes an imaging section 410, including a 3-camera 2-position (up or down) hardware with supplementary illumination 415, which was proven suitable for imaging store shelves up to 6' tall. It can be assumed that a store shelf imaging system would operate during the store hours, i.e., when the store lights are on. Under this assumption, the store illumination will provide the default-pose illumination that is not controllable by the present imaging system. Additionally, a controlled pose of an external light source into the system for glare mitigation is considered and can be implemented into processing. A controlled pose can be selected by taking into account the store layout, camera geometry, etc. More poses can be implemented into the system for deployment in, for example, various retail store environments.

It should be appreciated that at least a two-pose of external illumination may be implemented if the imaging system can be operated at non-store hours (i.e., store lights can be off). In such a case, the present system can choose a first pose from the external multi-pose illuminator as the default pose and the rest of the process will remain the same. It should also be noted that in such a case, system users have some control in selecting a preferred first pose by taking into account the store layout, camera geometry, energy consumption, etc.

Method steps as tested in a mock environment will now be described in greater detail so that persons of ordinary skill in the art are able to better understand features of the present invention.

First Pass: Acquire Images with Default Pose Illumination, Detect Glare ROIs, Determine if Additional Poses are Needed 1. Acquire Shelf Images with Default Pose Illumination (e.g., Using Store Lighting Only)

In this step, store shelf images can be acquired while the external light source is OFF. That is, the only light source is the uncontrollable store lighting. The present inventors used the imaging system shown in FIG. 4 to capture mock retail store shelf images. FIGS. 5a-5f show examples of six acquired images: from top to bottom of the shelf. There are 5 barcodes not recognized due to the imaging glare under this default pose illumination. The glare regions, shown in the images, actually overlap with more than 5 barcodes. The imaging system, however, overlapped fields of view. Hence, the actual number of barcodes not recognized was 5 for this segment of the mock store aisle.

2. Detect Glare Region(s) of Interest in the Images

Figure 5A:
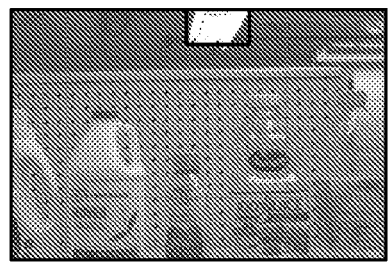
FIGS. 5a-5f illustrate photographs of a set of images obtained from a mock retail shelf segment using external illumination and detected glare ROIs therefrom.
Figure 5D:
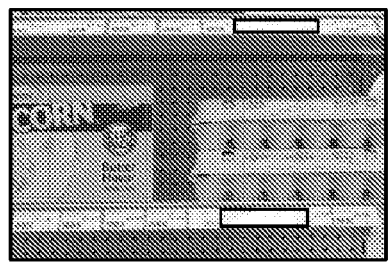
Figure 5B:
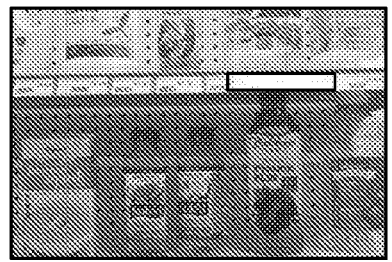
Figure 5E:
Figure 5C:
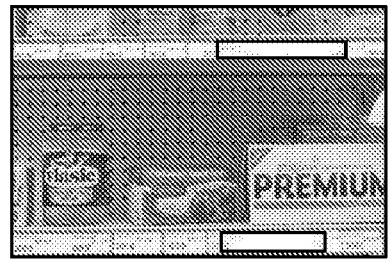
Figure 5F:

In this application, glare regions of interest (ROIs) are regions where the sensor responses exceed a certain level (i.e., saturated) such that the barcode can no longer be recognized (decoded) if barcode(s) or portion of barcode happen to overlap with the region. Since it can be assumed that users do not know where all barcodes are in the store a priori, the glare ROI detection needs to detect all near-saturated regions that are within the size range of a barcode or larger. In the tested method, all pixel values greater than a threshold (240 out of 255 in our implementation) were identified to yield binary outputs, morphological filtering was applied on the binary outputs to remove spurious noises due to imaging, connected-component analysis was applied to group pixels into regions, and regions were kept that have more than X (e.g., 12,000) number of pixels. FIG. 5 illustrates photographs of the detected glare ROIs acquired at blocked areas on the shelves when the method was applied to the acquired images. As shown in FIGS. 5a-5f, some glare ROIs indeed line-up with shelf-product barcodes (FIGS. 5b-5e), while some do not (FIG. 5a). It should also be noted that there was no glare ROI detected at the bottom shelf at this segment of aisle (FIG. 5f). For those images with at least one detected glare ROIs (FIG. 5a-5e), further image acquisition and processing was needed so that system users could recover potential issues of barcode not recognized due to glare. That is, the method continues with the iterative passes for these locations of the aisle and shelf. For those images without any detected glare ROI (FIG. 5f), no more image acquisition is needed (the energy of using external light source is saved) for these locations of the aisle and shelf. These images would thus pass directly to barcode recognition without iterative passes.

Iterative Passes: Acquire Images with Additional Poses of Illumination, Assess if Glare ROI Issues are Resolved 3. Acquire Images with a Different Pose of Illumination.

In this step, different pose(s) of illumination will be applied for re-acquiring shelf images, where there are still unresolved glare ROIs detected in first pass. The process can vary depending on the number of poses designed/implemented in the system. Different poses can be achieved using the multi-pose illuminator described with respect to FIG. 2.

Figure 7A:
FIGS. 7a-7d illustrate cropped portions of detected glare ROIs from the images in FIGS. 6a-6d using an additional pose of external illumination.
Figure 7B:
Figure 7C:
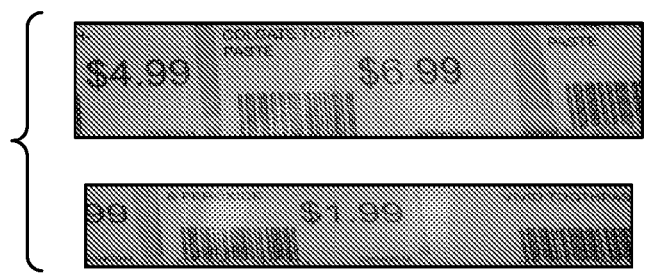
Figure 7D:

FIGS. 6*a-e* shows the additional 5 images acquired using a different pose of illumination at the same blocked shelf location where images in the photographs of FIGS. 5*a*-5*e* were acquired. The purpose of changing illumination pose (condition) is to either shift the location of glare regions or ideally eliminate any glare. Since there was no detected glare ROI for the bottom shelf (FIG. 6*f*), one less image was acquired in this pass. FIGS. 7*a-d* show the corresponding cropped portions of previously detected glare ROIs acquired at the circled shelf locations in FIGS. 5 and 6 using an additional pose of external illumination. That is, sub-images in FIGS. 7*a-d* are cropped images of the bar codes found in FIGS. 6*a-d* at the circled tag locations. FIG. 7*a* was taken from FIG. 6*b*. FIG. 7*b* was taken from FIG. 6*c*. FIG. 7C was taken from FIG. 6*d*. FIG. 7*d* was taken from FIG. 6*e*. It should be noted that for the mock retail setting and example, one additional pose effectively removed all detected glare ROIs on the shelf as seen in FIGS. 7*a*-7*d*. This may not be the case for the variety of actual retail store environments, which are not the same as our test environment. Hence, more poses of illumination might be needed in different environments.

4. Determine Whether any Remaining Detected Glare ROIs is Fixed

After images were acquired with additional pose(s) of illumination, portions of these additional images were analyzed to determine whether any remaining detected glare ROIs are fixed. Using the examples shown in FIGS. 5, 6, and 7, the sub-images in FIG. 7 could be examined to determine if any glare ROI was fixed using an additional pose of illumination. To make the decision, one possibility was to use the same color saturation analysis used in glare detection module (step 2 in first pass). That is, check if the substantial amount of pixels in the sub-images exceeded a threshold. The process of Step 3 and Step 4 could be repeated until additional poses of illumination fix remaining glare ROIs by providing other poses or until no more poses are available.

Barcode Recognition: Localize and Recognize Barcodes

5. Perform Barcode Localization and Recognition

After the first and optionally the iterative passes, barcode localization and recognition can be performed. In particular, in one embodiment barcode localization and recognition is performed on full images acquired with default-pose illumination and on cropped portions of images acquired with additional pose(s) of illumination that are determined to fix the detected glare ROIs. Through application of the method, 9 barcodes that were not recognizable in FIG. 5 were recognized (there are only 5 unique barcodes, multiple recognitions were due to the overlap of camera field of view).

Alternative Imaging and Processing Systems and Methods

The discussion so far is based on the embodiment shown in FIG. 2, which performs image acquisition under multi-pose illumination and processes the acquired images in a sequential fashion (first pass then iterative passes). The processing can be done in parallel after all images are acquired if desired. This is especially useful if the system is used to image the store first and then process the images later (e.g., in a back office). However, this would require larger hard-disk space onboard the robotic system shown in FIG. 4 for storing extra images. The image acquisition under multi-pose illumination may also be done in parallel (simultaneously) in some configuration, providing an important and novel alternative (as described below).

Figure 8:
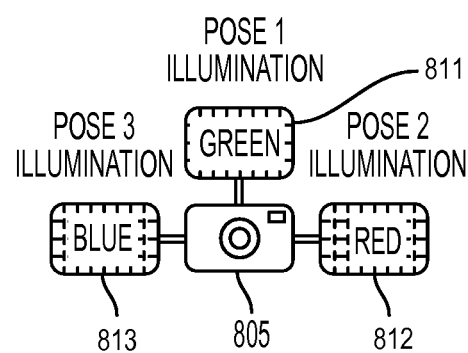
FIG. 8 illustrates an alternate embodiment for a multi-pose external illuminator that is provided in the form of a spectral-coded multiple-pose illuminator where pose-1 is coded with Green illumination, pose-2 with Red illumination, and pose-3 with Blue illumination.

Without loss of generality, a 3-pose illuminator and RGB cameras can be used as example to describe an alternative method and system. The key idea is to have matching encoding in the illuminators and decoding in sensor/camera. FIG. 8 illustrates a low cost embodiment with 3-pose illuminators 811, 812, 813, —including GREEN for pose-1 illuminator 811, RED for pose-2 illuminator 812, and BLUE for pose-3 illuminator 813—and a typical RGB camera 805. For sensing, the image is acquired while all three lights are on. For processing, the green-channel of the acquired images will be treated as the pose-1 images since the camera green sensitivity line-up with GREEN illumination. Similarly, the RED-channel and BLUE-channel of the acquired images will correspond to pose-2 and pose-3 images, respectively. Since RED, GREEN, and BLUE lights can be arranged at different poses and can sense the scene with a camera with matching R/G/B sensitivities, a system can be able to simultaneously acquire images under multiple poses of illumination. Following similar image analyses discussed earlier, such a system should be able to gain the same benefit of glare impact reduction for barcode recognition. This system can be generalized to handle more poses via spectral design of light sources and can use multi-spectral/hyper-spectral cameras. The arrangement of the spectrum of the lights and poses can be optimized based on camera sensitivities, signal-to-noise ratio (SNR), and deployed environments. For example, one may put GREEN light at the most preferred pose (pose-1) since a typical camera GREEN-channel has best SNR.

The present invention can enable the acquisition of images over a broad range of illumination and strategically select a range of illumination and then picks and chooses what to analyze and what portion to use among these acquired images to improve the barcode recognition rate. There is no attempt in the current invention to create a glare-free composite image out of the acquired multi-pose illuminated images in the described methods; and there is no need for aligning multiple images either. The present invention shows that tag recognition can be done with greater feasibility if the interest is on recognizing the barcodes as a whole rather than on generating a good-looking composite. The present invention performs image analysis (glare ROI detection and saturation verification) to determine whether extra-poses of illumination are needed. If so, the system can also determine what portions of images require further processing rather than blindly processing full images for all illumination conditions. The approaches taught herein could also determine the sequence and number of poses in a dynamic fashion. The idea of simultaneous capture of multi-pose illumination via matching the encoding of illuminator and the decoding of the sensor is clearly new.

Experimental Results

The baseline approach has been described in which images are acquired and processed under default store lighting only. The naïve 2-pose approach refers to blindly acquiring and processing twice as many images under the default store lighting and under our one-pose external light source. This has been shown to improve the recognition rate to 100% in tests by the present inventors and eliminates glare issues for barcode recognition. As shown in the following table, a tested system achieved the same recognition rate using a proposed method of taking ~30% fewer images (thus 30% energy saved for extra lighting). It also processed much fewer pixels in the barcode recognition (BCR) module compared to a naïve method. This is because the total area of the detected glare ROIs is much smaller compared to the full image. In fact, only ~60 MB additional pixels were processed out of the 8.21 GB pixels processed using the baseline method. The benefit is clear: a method can be used that will boost the recognition rate over the baseline method with very minimal additional processing at the expense of ~70% more image acquisition—a trade-off that is quite worthwhile in most retail environments/applications.

TABLE 1

Detailed performance comparison

|  | Total image acquired | Barcode recognition (BCR) rate | Total # of pixel processed by BCR |
| --- | --- | --- | --- |
| Baseline [3] | 492 | 93.7 ± 3% | 8.21 GB |
| Naïve 2-pose approach | 984 | 100% | 16.42 GB |
| Proposed method | 649 | 100% | 8.27 GB |

The invention claimed is:

1. A system for mitigating glare while reading printed information tags located in an enclosed environment using multi-pose illumination, comprising:
a shelf imager, the shelf imager for acquiring shelf images for printed information tag localization and recognition;
a printed information tag locator and recognizer analyzing all or a portion of acquired images to localize and recognize printed information tags;
an external illuminator, the external illuminator for providing at least one illumination condition for shelf image acquisition in addition to lighting associated with the enclosed environment, said external illuminator further comprises a multi-pose external illuminator, and wherein the multi-pose external illuminator provides different illumination conditions by varying positions of the multi-pose external illuminator around the shelf imager and onto the shelf, wherein the order of imaging of the poses of the multi-pose external illuminator for image capture is determined based on image analysis of previously acquired shelf images; and
a glare region of interest (ROI) detector, said glare region of interest (ROI) detector for analyzing at least a portion of the acquired shelf images for glare to determine whether additional images of the shelf images need to be acquired for recognition using a different illumination condition provided by the external illuminator.

2. The system of claim 1, wherein the positions of the poses of the multi-pose illuminator for image: capture is determined based on knowledge of shelf configuration of a store and environmental lighting of the store.

3. The system of claim 1, wherein the external illuminator further comprises at least two multi-pose external illuminators, and wherein at least one different illumination condition is provided onto the shelf by three different positions of the at least two multi-pose external illuminators around the shelf imager.

4. The system of claim 1, wherein the external illuminator further comprises three multi-pose external illuminators, and wherein different illumination conditions are provided onto the shelf by three different positions of the three multi-pose external illuminator around the shelf imager and each of three multi-pose external illuminators are assigned a different color selected from: GREEN, RED, BLUE, and the shelf imager is an RGB camera.

5. The system of claim 1, wherein said external illuminator further comprises at least two multi-pose external illuminators and wherein different illumination conditions are provided onto the shelf by different positions of the these multi-pose external illuminator around the shelf imager and each of these multi-pose external illuminators are assigned a different spectral band and the shelf imager is a multi-spectral camera with sensitivities optimized to match the spectral bands.

6. The system of claim 1, wherein the printed information tags contain data including at least one of: barcodes, QR codes, UPCs, and serial numbers.

7. The system of claim 6, wherein the external illuminator further comprises a multi-pose external illuminator, and wherein the multi-pose external illuminator provides different illumination conditions onto the shelf by varying positions of the multi-pose external illuminator around the shelf imager.

8. The system of claim 6, wherein the external illuminator further comprises three multi-pose external illuminators, and wherein multi-pose external illuminator provides at least one different illumination condition onto the shelf by at least one of three different positions of the three multi-pose external illuminator around the shelf imager.

9. The system of claim 6, wherein the external illuminator further comprises three multi-pose external illuminators and wherein the different illumination condition are provided onto shelves by three different positions of the three multi-pose external illuminator around the shelf imager and each of three multi-pose external illuminators are assigned a different color selected from: GREEN, RED, and BLUE.

10. A system for mitigating glare while reading printed information tags located in an enclosed environment using multi-pose illumination, comprising:
a shelf imager, the shelf imaging for acquiring shelf images for printed information tag localization and recognition;
printed information tag locator and recognizer analyzing all or a portion of acquired images to localize and recognize printed information tags;
an external illuminator, the external illuminator for providing at least one illumination condition for shelf image acquisition in addition to lighting associated with the enclosed environment, said external illuminator further comprises a multi-pose external illuminator, and wherein the multi-pose external illuminator provides different illumination conditions by varying positions of the multi-pose external illuminator around the shelf imager and onto the shelf, wherein the order of imaging of the poses of the multi-pose external illuminator for image capture is determined based on image anlaysis of previously acquired shelf images; and
a glare region of interest (ROI) detector, the glare region of interest (ROI) detector for analyzing at least a portion of the acquired shelf images for glare to determine at least one of whether additional images of the shelf images need to be acquired for recognition using at least one different illumination condition provided by the external illuminator, and whether full or portion of acquired images need to be analyzed by barcode locator and recognizer.

11. The system of claim 10, wherein said external illuminator further comprises three multi-pose external illuminators, and wherein multi-pose external illuminator provides different illumination conditions on the shelf provided by three different positions of the three multi-pose external illuminator around the shelf imager.

12. The system of claim 10, wherein said external illuminator further comprises three multi-pose external illuminators, and wherein multi-pose external illuminator provides different illumination condition onto the shelf by providing at least one of three different positions of the three multi-pose external illuminator around the shelf imager and each of three multi-pose external illuminators are assigned a different color selected from: GREEN, RED, BLUE, and the shelf imager is a RGB camera.

13. A method for mitigating glare while reading printed information tags using multi-pose illumination, comprising:
   (a) acquiring shelf images using external illumination;
   (b) detecting a first set of glare regions of interest from the shelf images;
   (c) acquiring a new set of shelf images with a different pose from an external illuminator for at least one glare region of interest from the first set of glare regions of interest detected in step (b), said external illuminator further comprises a multi-pose external illuminator, and wherein the multi-pose external illuminator provides different illumination conditions by varying positions of the multi-pose external illuminator around the shelf imager and onto the shelf, wherein the order of imaging of the poses of the multi-pose external illuminator for image capture is determined based on image analysis of previously acquired shelf images;
   (d) checking if glare remains on the new set of images for the at least one glare region of interest and replace the at least one glare region of interest with corresponding glare regions of interest from the new set of images; and
   (e) repeating step (c) through (d) until no more detected glare regions of interest are left or all poses of the external illuminator have been explored, then conduct printed information tag data recognition.

14. The method of claim 13, wherein the printed information tag is a barcode.

15. The method of claim 13, wherein the printed information tag is a QR code.

16. The method of claim 13, wherein the printed information tag is a serial number.

17. The method of claim 13, wherein said step of acquiring shelf images using external illumination includes use of an external illuminator, said external illuminator further comprising a multi-pose external illuminator, wherein the multi-pose external illuminator provides at least one different illumination condition on the shelf provided by varying positions of the multi-pose external illuminator around a shelf imager.

* * * * *